United States Patent
Taylor et al.

(10) Patent No.: US 6,415,090 B1
(45) Date of Patent: Jul. 2, 2002

(54) OPTICAL FIBER COATINGS

(75) Inventors: Carl R. Taylor, Lawrenceville; Peter A. Weimann, Atlanta, both of GA (US)

(73) Assignee: Fitel USA Corp., Norcross, GA (US)

( * ) Notice: Subject to any disclaimer, the term of this patent is extended or adjusted under 35 U.S.C. 154(b) by 38 days.

(21) Appl. No.: 09/712,620

(22) Filed: Nov. 13, 2000

(51) Int. Cl.⁷ ............................................. G02B 6/02
(52) U.S. Cl. ........................................................ 385/128
(58) Field of Search .................................. 385/126, 127, 385/128, 147

(56) References Cited

U.S. PATENT DOCUMENTS

| | | | |
|---|---|---|---|
| 4,801,186 A | * | 1/1989 | Wagatsuma et al. ........ 385/128 |
| 4,956,198 A | * | 9/1990 | Shama et al. ............... 427/520 |
| 4,962,143 A | * | 10/1990 | Satake et al. ............. 264/288.4 |
| 5,024,507 A | * | 6/1991 | Minns et al. ............... 385/106 |
| 5,139,872 A | * | 8/1992 | Lapin et al. ................. 385/123 |
| 5,146,531 A | * | 9/1992 | Shustack ..................... 385/128 |
| 5,188,864 A | * | 2/1993 | Lee et al. .................... 427/387 |
| 5,352,712 A | * | 10/1994 | Shustack ..................... 385/123 |
| 5,409,777 A | * | 4/1995 | Kennedy et al. ........... 428/34.4 |
| 5,527,835 A | * | 6/1996 | Shustack ..................... 385/123 |
| 5,538,791 A | * | 7/1996 | Shustack ..................... 385/123 |
| 6,181,859 B1 | * | 1/2001 | Suzuki et al. ............... 385/123 |

* cited by examiner

*Primary Examiner*—Tulsidas Patel
(74) *Attorney, Agent, or Firm*—Peter V. D. Wilde; Thomas, Kayden, Horstemeyer & Risley LLP

(57) ABSTRACT

The outside coating of dual coated optical fibers is improved by the addition of a filler to increase the microbending resistance of the optical fiber. The coating is improved by the addition of very small clay platelets, with the platelets aligned along the fiber axis. It is found that standard polymer coatings can be loaded with enough filler to enhance the mechanical properties, while the particulates are small enough to be essentially transparent to the UV curing radiation.

21 Claims, 2 Drawing Sheets

OPTICAL FIBER COATINGS

FIELD OF THE INVENTION

This invention relates to polymer coating materials for optical fibers.

BACKGROUND OF THE INVENTION

Optical fiber production generally involves drawing a glass fiber from a glass preform, which usually is of silica glass, then applying coating material to the fiber. The coating is applied instantly after draw to prevent contamination or contact of any kind with the nascent fiber surface. The coating material is typically a UV curable polymer. Dual coated optical fibers are usually coated with a first layer of relatively soft polymer and a second layer of a higher modulus polymer for maintaining high strength and abrasion resistance. The combination of a soft primary coating and a relatively rigid secondary coating contributes to minimizing microbending losses. Microbending losses occur when the fiber is subject to small radii deformations which typically result from kinks or dents in the fiber coating. These occur in the use environment when the fiber passes over sharp edges, or when particulate contaminants deform the surface of the fiber. Extensive work has been devoted to minimizing microbending losses. Most of these efforts have been toward improved engineering of the optical fiber coating. The mechanical properties of the coating strongly affect the resistance of the optical fiber to microbending losses.

Optical fibers are usually coated by a wet coating process, typically involving passing the newly drawn fiber through a reservoir of liquid prepolymer material, and then curing the prepolymer by exposure to curing radiation, most commonly, ultra-violet light. In a dual coating process, coatings are applied in tandem or simultaneously (using a two compartment and dual die applicator). The tandem arrangement applies a first coating layer which is cured, and the second coating layer is applied over the first, and cured. In the simultaneous dual coating arrangement, both coatings are applied in a prepolymer state, after which they are cured.

The usual fiber coating materials are UV cured polyacrylates. These polymers are sufficiently transparent to UV curing radiation, i.e., wavelengths typically in the range 200–400 nm, to allow full curing at high draw speeds. Other transparent coating materials, such as alkyl-substituted silicones and silsesquioxanes, aliphatic polyacrylates, polymethacrylates and vinyl ethers have also been used as UV cured optical fiber coatings. See e.g. S. A. Shama, E. S. Poklacki, J. M. Zimmerman "Ultraviolet-curable cationic vinyl ether polyurethane coating compositions" U.S. Pat. No. 4,956,198 (1990); S. C. Lapin, A. C. Levy "Vinyl ether based optical fiber coatings" U.S. Pat. No. 5,139,872 (1992) ;P. J. Shustack "Ultraviolet radiation-curable coatings for optical fibers" U.S. Pat. No. 5,352,712 (1994). The coating technology using UV curable materials is well developed. Coatings using visible light for curing, i.e. light below 600 nm, may also be used.

To increase the resistance of the fiber coating too abrasion damage, various fillers have been added to the polymer coating. Hard particulate materials, for example, titania, alumina or silica, would appear to be good candidates for such fillers. Fumed silica is suggested as a filler in, for example, U.S. Pat. No. 5,188,864, issued Feb. 23, 1993. However, there are a variety of known reasons why particulate fillers in-optical fiber coatings should be avoided. These include reduction in fiber test strength, and impairment of the UV curing process due to the opacity of particulate fillers.

An optical fiber coating parameter that is important in minimizing microbending losses is the bending modulus or bend strength of the coated fiber. Any coating modification that adds bend strength to the finished fiber would appear to reduce the potential for microbending losses. At the same time however, it is important that the fiber coating not be too stiff. Excessive stiffness in the overall coating leads to strains in the fiber from normal bending.

Optical fiber coatings with enhanced microbending resistance are continually being sought in fiber coating technology.

SUMMARY OF THE INVENTION

We have discovered new filler materials for optical fiber coatings that increase the microbend strength of the fiber without the adverse effects just mentioned. The new fillers are one or more of a class of so-called nanoclay particulates. These particulates comprise naturally occurring clay particles with a plate-like morphology, and very small overall dimensions. The clay platelets, when aligned along the axis of the optical fiber, increase significantly the microbending modulus of the coating. With proper choice of the particle dimensions, the efficiency of the UV curing process is essentially unaffected.

DETAILED DESCRIPTION OF THE INVENTION

The following describes coating of optical fibers at high draw speeds and wherein the coatings are of good quality, with improved microbending strength. It is to be understood that the method of application is adaptable for use in coating filamentary materials other than the silica glass typically used in optical fibers.

Figure 1:
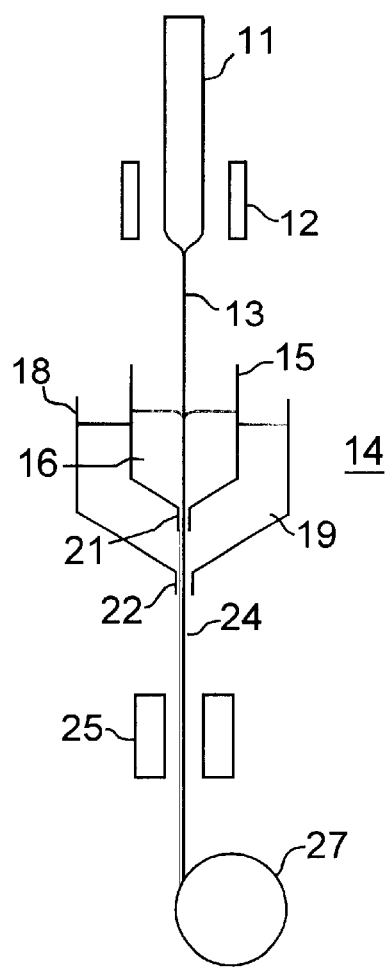
FIG. 1 is a schematic view of a fiber draw and coating apparatus.

FIG. 1 shows a schematic representation of a fiber draw apparatus. Optical fiber preform 11 is shown with susceptor 12 representing the furnace (not shown) used to soften the glass preform and initiate fiber draw. The drawn fiber is shown at 13. The nascent fiber surface is then passed through dual coating cup, indicated generally at 14, which has inner chamber 15 containing the primary coating prepolymer 16, and outer chamber 18 containing the secondary coating prepolymer 19. The liquid coated fiber from the first chamber exits through die 21 and enters the secondary coating solution, then exits from the second coating chamber through die 22. As is well known, the combination of the first and second dies, and the fluid dynamics of the prepolymers, controls the coating thickness. The prepolymer coated fiber 24 is then exposed to UV lamps 25 to cure the prepolymer and complete the coating process. Other curing radiation may be used where appropriate. The fiber, with the coating cured, is then taken up by take-up reel 27. The take-up reel controls the draw speed of the fiber. Draw speeds in the range typically of 1–50 m/sec. can be used. It is important that the fiber be centered within the coating cup, and particularly within the exit dies 21 and 22, to maintain concentricity of the fiber and coating. A commercial apparatus typically has pulleys that control the alignment of the fiber. Hydrodynamic pressures in the two die themselves aid in centering the fiber. A stepper motor, controlled by a micro-step indexer (not shown), controls the take-up reel.

Coating materials for optical fibers are typically urethanes, acrylates, or urethane-acrylates, with a UV photoinitiator added. In dual coated fibers, typical primary or inner coating materials are soft, low modulus materials such as silicone, hot melt wax, or any of a number of polymer materials having a relatively low modulus. The usual materials for the second or outer coating are high modulus polymers, typically urethanes or acrylics. In commercial practice both materials may be low and high modulus acrylates. The coating thickness typically ranges from 150–300 mm in diameter, with approximately 240 mm standard.

The coating cups 15 and 18 are shown open in this schematic, and an open (non-pressurized) cup is a useful option. However, in a typical commercial draw apparatus the cup is closed, with a single opening or entrance die just large enough to allowing passage of the fiber into the cup. A pressure is maintained in the coating fluid. This pressure, e.g. 50–250 psi, aids in reducing bubble formation in the applied coating. Details of a typical coating cup and die are given in U.S. Pat. No. 4,374,161 of Geyling et al.

The improved coating material of the invention has a filler comprising a specialized form of clay. Natural clays are found in a variety of forms, typically small particles of hydrated aluminum and/or magnesium silicates. The clay optical fiber coating filler materials of the invention have special characteristics. First, they are anhydrous, since water is a principal contaminant in optical fibers. Second the particles are exfoliated from stratified clay materials, resulting in particles with a platelike morphology. Third, the plates are made small enough to be essentially transparent to the UV radiation used to cure the coating.

Figure 2:
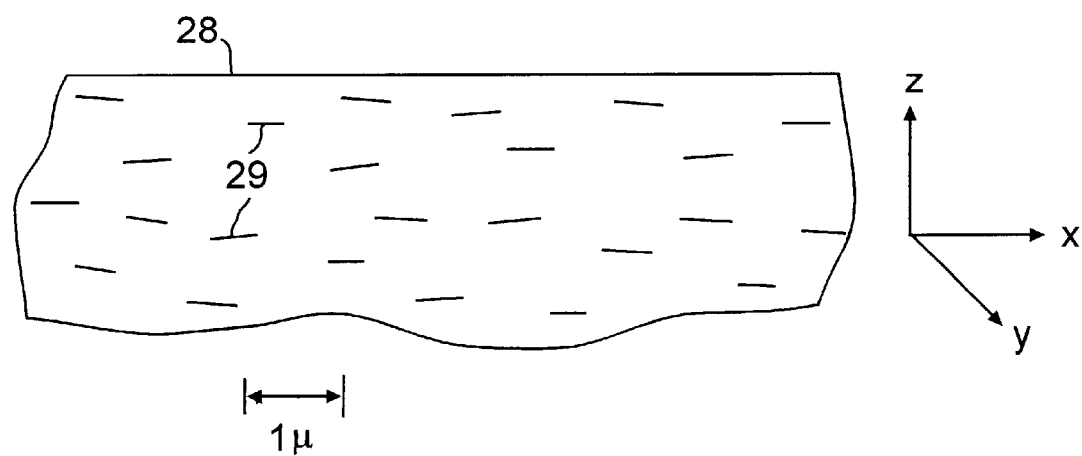
FIG. 2 is a schematic microscopic view of a portion of the optical fiber coating of the invention showing the filling material in detail.

With reference to FIG. 2, a cutaway portion of a cured optical fiber coating according to the invention is shown at 28, with the clay particles of the filler material of the invention shown at 29. The particles are platelets extending in the x-y plane, and are very thin in the z-plane. The important feature of the coating composition of the invention is that the platelike clay particles, which normally adhere together in stacks, are exfoliated into mostly individual platelets which are intercalated with polymer. The preferred particles have a predominant fraction (>50%) with a maximum x-y dimension of 1000 nm, preferably a minimum x-y dimension of 100 nm, and a thickness, z-dimension, of less than 15 nm. In terms of aspect ratio, i.e. maximum length (x- and/or y-) to thickness, a range of 15–2000 is suitable. Particles with this characteristic are referred to herein as platelets. The predominant alignment, as represented in FIG. 2, is horizontal with respect to the fiber and the fiber coating surface. The platelets align inherently with the mild shear stresses that occur in mixing and applying the coating. The amount of filler should be enough to obtain the desired increase in bending modulus, but not interfere excessively with the cure process. The individual particles are small enough to be largely transparent to the cure radiation. However, excessive loading, where platelets align continuously end to end to form a blanket at the coating surface, may prevent adequate curing. Typically, proper loading will be in the range of 1–10% by weight.

The filler material is prepared by dehydrating the particulates, then dispersing them in an organic carrier. The carrier performs the physical function of preventing rehydration of the particles, and also treats the surface of the particles to render the particles compatible with prepolymer liquid in which they are dispersed. A wide variety of organic materials that are compatible with the coating polymers may be used. Acrylate polymers similar to the coating material itself are suitable. Carriers with polar groups, such as long chain hydrocarbons terminating in an amine group, are recommended. The amine group attaches to the clay particle and prevents rehydration of the particulates.

The following examples represent the practice of the invention.

EXAMPLE 1

An optical fiber coating is prepared by blending 5.0 weight % of Nanomer 1.30E, available from Nanocor, with DeSolite 3471-2-136, available from DSM Desotech Inc. The latter is a conventional outer coating prepolymer comprising multifunctional acrylates, and a UV photoinitiator for UV curing. The filler is dispersed in the prepolymer resin using a medium shear mixer. The resin may be preheated slightly for mixing. The mixed prepolymer is introduced into coating cup 18 of the apparatus of FIG. 1 and an optical fiber is drawn as described earlier. The combination of blending the filler platelets prior to filling the applicator (14 of FIG. 1), with the hydrodynamic extrusion forces exerted by die 22, aligns the platelets 29 as shown in FIG. 2. The drawn and cured optical fiber, which normally exhibits a flexural modulus of approximately 300 MPa at 23° C. will show an enhanced modulus of the order of 150% or greater.

EXAMPLE 2

An optical fiber coating is prepared by blending 5.0 weight % of Cloisite 20A, available from Southern Clay Products, with DeSolite 3471-2-136, available from DSM Desotech Inc. Cloisite 20A is a highly hydrophobic clay with platelet clay particles of the nature described above. The filler is dispersed in the prepolymer resin as in the first example, and an optical fiber drawn. Again, the drawn and cured optical fiber, exhibits an enhanced modulus of the order of 150% or greater.

In the foregoing examples the filled coating of the invention is used as the outer protective coating on a drawn optical fiber. The filled coating material is also well adapted for coating endless filaments of a variety of filament materials. It is particularly suited for coating multifiber ribbons. Multifiber ribbons are assemblies of two or more coated optical fibers arranged side-by-side and coated together to form a ribbon cable. In some cases a primary ribbon coating, of a soft polymer material, is applied and then overcoated with an outer coating. The filled materials of the invention are particularly useful for the outer coating of an optical fiber ribbon.

Figure 3:
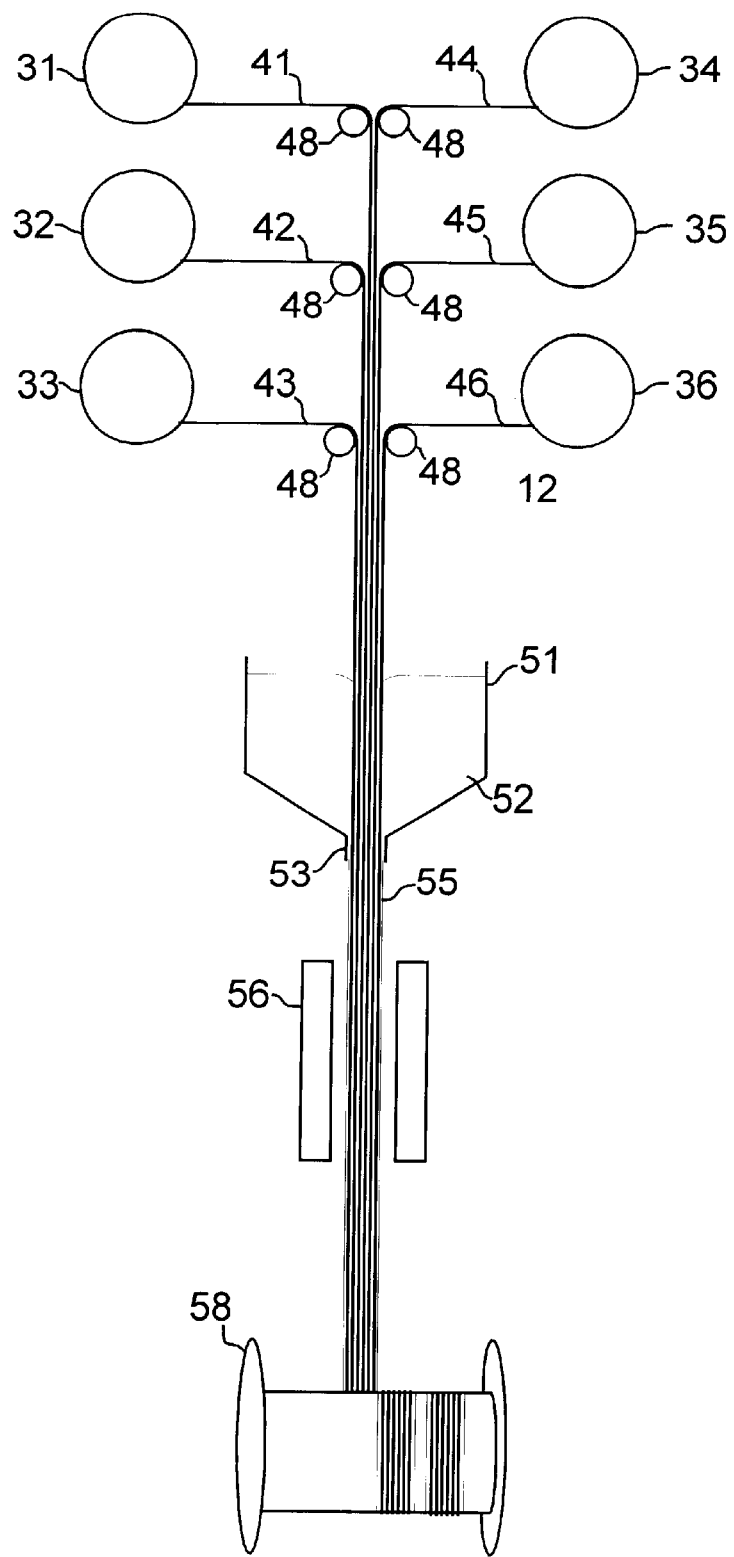
FIG. 3 is a schematic view of an apparatus suitable for drawing optical fiber ribbons.

For this application, the draw apparatus is modified so as to provide an expanded die, allowing several fibers to be reeled side by side through a multifiber coating die. The fiber ribbon draw operation resembles that described in conjunction with FIG. 2 except that the individual fibers are already coated and reeled. FIG. 3 shows a typical arrangement in schematic form. In an actual commercial apparatus the fiber handling mechanisms are more sophisticated than those shown here. In FIG. 3, six reels of coated fiber 31–36 are shown with fibers 41–46 drawn from the reels over rollers 48 that position the six fibers in linear ribbon alignment as shown. The multiple fibers pass through coating cup 51 that contains the prepolymer/filler mixture 52 of the invention. Die 53 forms the desired ribbon shape. The prepolymer coated ribbon 55 passes through curing stage 56 and is reeled on reel 58.

The following examples describe a typical coating process for optical fiber ribbon.

EXAMPLE 3

An optical fiber ribbon coating is prepared by blending 5.0 weight % of Nanomer 1.30E, available from Nanocor, with Cabelite 950-706, available from DSM Desotech Inc. The latter is a conventional ribbon coating prepolymer comprising multifunctional acrylates, and a UV photoinitiator for UV curing. The filler is dispersed in the prepolymer resin using a medium shear mixer as in the earlier examples. The mixed prepolymer is introduced into coating cup 51 of the apparatus of FIG. 3 and an optical fiber ribbon is drawn. The drawn and cured optical fiber ribbon exhibits an enhanced modulus of the order of 150% or greater.

EXAMPLE 4

An optical fiber ribbon coating is prepared by blending 5.0 weight % of Cloisite 10A, available from Southern Clay Products, with Cabelite 751 Series, available from DSM Desotech Inc. The latter is a conventional ribbon coating prepolymer comprising multifunctional acrylates, and a UV photoinitiator for UV curing. It also contains a UV curable ink for color coding the optical fiber ribbon. The filler is dispersed in the prepolymer resin using a medium shear mixer as in the earlier examples. The mixed prepolymer is introduced into coating cup 51 of the apparatus of FIG. 3 and an optical fiber ribbon is drawn. The drawn and cured optical fiber show an enhanced modulus of the order of 150% or greater.

The clay filler materials of the invention are basically composed of well known mineral compositions that comprise mainly silicates of aluminum and/or magnesium. Many suitable materials are available commercially from suppliers mentioned in the Examples. A preferred mineral clay is montmorillonite. Hectorite or bentonite, or mixtures of any of these minerals may be used. All of these materials comprise particulates that are relatively hard. The main property of interest for the purpose of the invention are the physical characteristics of the materials, i.e. platelike particles, as described earlier, with very small particle size. In defining the particle size, the length is considered the longest dimension of the platelet.

It will be evident to those skilled in the art that the effectiveness of the invention relies on having a large portion of the platelets aligned approximately with the axis of the optical fiber. This imparts selective enhancement of the bending modulus in the plane containing the fiber axis. Platelets aligned vertically with respect to the fiber core are relatively ineffective. Thus it is preferred that more than half of the platelets incorporated into the optical fiber coating are aligned so that the x-y plane of the platelets (the major plane) is aligned within 30° with the axis of the fiber.

Polymer coatings are typically made by applying a prepolymer to the article being coated and curing the prepolymer. In conventional commercial coating process, curing is effected by light, as in the process of the invention, or by heat. For the former curing method, the coating composition will contain a photoinitiator, and articles cured by light will show chemical evidence of the photoinitiator.

In concluding the detailed description, it should be noted that it will be obvious to those skilled in the art that many variations and modifications may be made to the preferred embodiment without substantial departure from the principles of the present invention. All such variations, modifications and equivalents are intended to be included herein as being within the scope of the present invention, as set forth in the claims.

What is claimed is:

1. A process for coating an article comprising:
   (a) coating the article with a coating fluid,
   (b) exposing the coated article to light radiation of 200–600 nm to cure the coating,
   the invention characterized in that the coating fluid comprises:
   (i) a prepolymer, and
   (ii) 1–10% of a filler, the filler consisting of clay platelets having an aspect ratio in the range 15–2000 and a maximum average length of less than 1000 nm.

2. The process of claim 1 wherein the article is an optical fiber.

3. The process of claim 2 wherein the optical fiber is passed through a container, the optical fiber having an axis along the length of the optical fiber, the container containing a coating fluid and having an exit die, and the optical fiber is passed axially through the exit die thereby producing a coated optical fiber.

4. The process of claim 3 wherein two or more optical fibers are passed simultaneously through the container to form an optical fiber ribbon.

5. The process of claim 1 wherein the clay platelets comprise a mixture of silicates selected from the group consisting of aluminum, magnesium and mixtures thereof.

6. The process of claim 1 wherein the clay platelets have a thickness of less than 15 nm.

7. The process of claim 1 wherein the clay platelets comprise one or more minerals selected from the group consisting of montmorillonite, hectorite and bentonite.

8. The process of claim 3 wherein more than 50% of the clay platelets are aligned so that the x-y plane of the clay platelets is aligned within 30° of the axis of the optical fiber.

9. The process of claim 3 wherein the prepolymer comprises an acrylate.

10. A coated article comprising:
    (a) an article,
    (b) a coating covering the article, the coating comprising:
       i. a polymer,
       ii. a photoinitiator,
       iii. 1–10% of a filler, the filler consisting of clay platelets having an aspect ratio in the range 15–2000 and a maximum average length of less than 1000 nm.

11. An optical fiber comprising:
    (a) a glass fiber,
    (b) a first coating covering the glass fiber,
    (c) a second coating covering the first coating the second coating comprising a polymer having 1–10% of a filler, the filler consisting of clay platelets having an aspect ratio in the range 15–2000 and a maximum average length of less than 1000 nm.

12. The optical fiber of claim 11 wherein the clay platelets comprise a mixture of silicates selected from the group consisting of aluminum, magnesium and mixtures thereof.

13. The optical fiber of claim 11 wherein the clay platelets have a thickness of less than 15 nm.

14. The optical fiber of claim 11 wherein the clay platelets comprise one or more minerals selected from the group consisting of montmorillonite, hectorite and bentonite.

15. The optical fiber of claim 11 wherein the glass fiber has an axis along the length of the glass fiber and wherein more than 50% of the clay platelets are aligned so that the x-y plane of the clay platelets is aligned within 30° of the axis of the glass fiber.

16. The optical fiber of claim 11 wherein the polymer comprises an acrylate.

17. An optical fiber ribbon comprising:
(a) a plurality of optical fibers aligned side-by-side with the axes of the plurality of optical fibers extending in the same direction,
(b) a coating covering the plurality of optical fibers the coating comprising a polymer having 1–10% of a filler, the filler consisting of clay platelets having an aspect ratio in the range 15–2000 and a maximum average length of less than 1000 nm.

18. The optical fiber ribbon of claim 17 wherein the clay platelets comprise a mixture of silicates selected from the group consisting of aluminum, magnesium and mixtures thereof.

19. The optical fiber ribbon of claim 17 wherein the platelets have a thickness of less than 15 nm.

20. The optical fiber ribbon of claim 17 wherein the clay comprises one or more minerals selected from the group consisting of montmorillonite, hectorite and bentonite.

21. The optical fiber of claim 17 wherein the platelets are aligned so that the x-y plane of the platelets (the major plane) is aligned within 30° of the axes of the plurality of optical fibers.

* * * * *